(12) United States Patent
Bashandy (10) Patent No.: US 9,225,592 B2
(45) Date of Patent: *Dec. 29, 2015

(54) SYSTEM AND METHOD FOR PROTECTION AGAINST EDGE NODE FAILURE

(71) Applicant: Cisco Technology, Inc., San Jose, CA (US)

(72) Inventor: Ahmed R. Bashandy, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,279

(22) Filed: Jun. 9, 2014

(65) Prior Publication Data

US 2014/0286155 A1 Sep. 25, 2014

Related U.S. Application Data

(63) Continuation of application No. 13/533,580, filed on Jun. 26, 2012, now Pat. No. 8,750,095.

(51) Int. Cl.
*H04J 1/16* (2006.01)
*H04L 12/28* (2006.01)
*H04L 12/24* (2006.01)
*H04L 12/745* (2013.01)
*H04L 12/751* (2013.01)
*H04L 12/703* (2013.01)

(52) U.S. Cl.
CPC ........ *H04L 41/0668* (2013.01); *H04L 41/0663* (2013.01); *H04L 45/02* (2013.01); *H04L 45/28* (2013.01); *H04L 45/748* (2013.01)

(58) Field of Classification Search
USPC ................................. 370/218, 220, 401, 410
See application file for complete search history.

(56) References Cited

U.S. PATENT DOCUMENTS

| | | |
|---|---|---|
| 7,860,104 B1 | 12/2010 | Aggarwal |
| 8,000,231 B2 | 8/2011 | Li et al. |
| 8,014,293 B1 | 9/2011 | Cole et al. |
| 8,023,429 B2 | 9/2011 | Briscoe et al. |
| 8,037,175 B1 | 10/2011 | Apte et al. |
| 2006/0140136 A1 | 6/2006 | Filsfils et al. |
| 2006/0184999 A1* | 8/2006 | Guichard et al. ................. 726/3 |
| 2007/0030855 A1 | 2/2007 | Ribiere et al. |
| 2007/0245034 A1 | 10/2007 | Retana et al. |
| 2011/0149987 A1 | 6/2011 | Satterlee et al. |
| 2011/0205885 A1 | 8/2011 | Kini et al. |
| 2011/0211459 A1 | 9/2011 | Meloche |
| 2011/0219231 A1 | 9/2011 | Shen et al. |
| 2012/0051212 A1 | 3/2012 | Xu et al. |
| 2012/0106507 A1 | 5/2012 | Venkataswami |

(Continued)

*Primary Examiner* — Andrew Lee
(74) *Attorney, Agent, or Firm* — Baker Botts L.L.P.

(57) ABSTRACT

In one embodiment, a method includes determining, by an edge router, a plurality of prefixes reachable by the edge router, each prefix indicating a range of Internet Protocol (IP) addresses. The method further includes grouping, by the edge router, the plurality of prefixes into one or more groups, wherein each group is associated with a particular repair edge router and the prefixes in each particular group are reachable by both the edge router and the particular repair edge router associated with the particular group. The method further includes communicating instructions, from the edge router to a core router, to send data packets associated with the prefixes in each particular group to the particular edge router associated with the particular group if the edge router becomes unreachable.

20 Claims, 4 Drawing Sheets (56) References Cited

U.S. PATENT DOCUMENTS

| | | |
|---|---|---|
| 2012/0144066 A1 | 6/2012 | Medved et al. |
| 2012/0147786 A1* | 6/2012 | Miyao .......................... 370/255 |
| 2012/0147883 A1 | 6/2012 | Uttaro et al. |
| 2012/0158924 A1* | 6/2012 | Miyao .......................... 709/220 |
| 2012/0177054 A1* | 7/2012 | Pati et al. ................. 370/395.53 |
| 2012/0281586 A1 | 11/2012 | Chase et al. |
| 2013/0315067 A1 | 11/2013 | Satterlee et al. |
| 2014/0003227 A1* | 1/2014 | Scudder et al. ............... 370/218 |
| 2014/0198794 A1* | 7/2014 | Mehta et al. .................. 370/392 |

* cited by examiner

SYSTEM AND METHOD FOR PROTECTION AGAINST EDGE NODE FAILURE

RELATED APPLICATIONS

This application is a continuation of U.S. application Ser. No. 13/533,580 filed Jun. 26, 2012 and entitled "System and Method for Protection Against Edge Node Failure" now U.S. Pat. No. 8,750,095.

TECHNICAL FIELD

This disclosure relates generally to data routing and more particularly to a system and method for protection against edge node failure.

BACKGROUND

In a data network, network devices route data packets to other network devices. For example, a data network may include one or more core routers that carry packets tunneled to or from one or more edge routers. When a particular edge router fails or otherwise becomes unreachable, the core routers must reroute data packets that were originally intended for the failed edge router to another edge router. Typically, this requires either the core routers waiting for routing tables to be updated, or the core routers learning the prefixes that are reachable by each of the edge routers.

DESCRIPTION OF EXAMPLE EMBODIMENTS

In a data network, network devices route data packets to other network devices. For example, a particular service provider network may include one or more core routers that tunnel data packets to a number of provider edge (PE) routers. Each of the PE routers may be communicatively coupled to one or more customer edge (CE) routers and may be able to reach a number of prefixes associated with the CE routers. When a particular PE router fails or otherwise becomes unreachable (e.g. the link between the PE router and the core router fails, the PE router crashes, the PE router is powered off, etc.), the core routers reroute data packets that were originally intended for the failed PE router to another PE router.

Typical solutions of rerouting data packets by core routers around a failed PE router are inefficient and undesirable. For example, some core routers wait for routing tables to be updated after Border Gateway Protocol (BGP) or Interior Gateway Protocol (IGP) re-converges. This is both inefficient and slow. In another example, some core routers learn all of the prefixes that are reachable by each of the PE routers that are communicatively coupled to the core router. This may become costly and difficult to maintain as the number of prefixes in the network increase because the routing table maintained by the core router is dependent on the number of prefixes in the network.

The teachings of the disclosure recognize that it would be desirable to provide protection against edge node failure without waiting for IGP or BGP to re-converge, without having to maintain routing tables on a core router that are dependent on the number of prefixes in the network, or without any of the other inefficiencies of existing network devices. The following describes a system and method for protection against edge node failure, according to certain embodiments.

Figure 1:
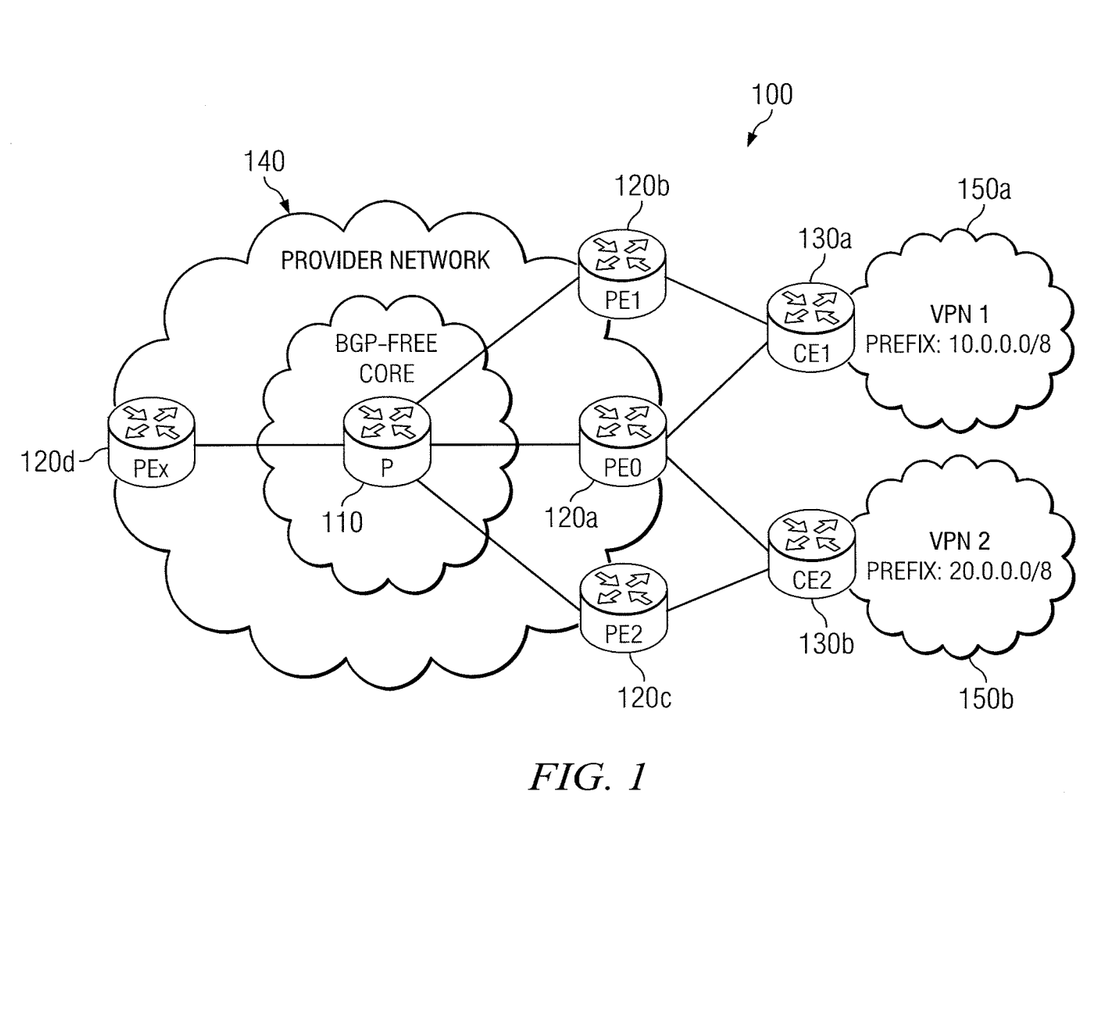
FIG. 1 illustrates an example system for providing protection against edge node failure, according to certain embodiments.

FIG. 1 illustrates an example system 100 for providing protection against edge node failure. In particular embodiments, system 100 includes a core router 110, PE routers 120a-120d, CE routers 130a-130b, a service provider network 140, and virtual private networks (VPNs) 150a-150b. Core router 110 is communicatively coupled to PE routers 120 within service provider network 140. PE routers 120 are communicatively coupled to certain CE routers 130 as illustrated. Each CE router 130 resides in a respective VPN 150 as illustrated. While system 100 is illustrated as including one core router 110 and various numbers of PE routers 120 and CE routers 130, the disclosure anticipates any appropriate number and configuration of core routers 110, PE routers 120, and CE routers 130.

In general, system 100 provides protection against failure of PE routers 120. As described in more detail below, a particular PE router 120, such as PE router 120a, determines a plurality of prefixes (i.e., a range of Internet Protocol (IP) addresses) that it is able to reach. For example, PE routers 120a may be able to reach prefixes that are associated with both CE router 130a and CE router 130b. PE router 120a may determine one of the other PE routers 120 (e.g., PE router 120b and/or PE router 120c) that may serve as a repair PE router in the event that PE router 120a becomes unreachable. In some embodiments, PE router 120a may group the prefixes that it is able to reach into one or more groups. For example, if both PE router 120a and PE router 120b are able to reach a first set of prefixes that are associated with CE router 130a, those prefixes may be placed into a first group. Likewise, if both PE router 120a and PE router 120c are able to reach a second set of prefixes that are associated with CE router 130b, those prefixes may be placed into a second group. PE router 120a may inform core router 110 that in the event that PE router 120a becomes unreachable, data packets associated with prefixes in the first group should be routed through PE router 120b and data packets associated with prefixes in the second group should be routed through PE router 120c. PE router 120a informs core router 110 by advertising a next-hop pair that includes: 1) a next-hop, and 2) a repair next-hop that identifies the appropriate repair PE router (e.g., PE router 120b or 120c). In some embodiments, PE router 120a additionally advertises a repair label to be inserted by core router 110 into data packets that are rerouted through a repair PE router when PE router 120a becomes unreachable. When core router 110 determines that PE router 120a has become unreachable, it uses the information advertised by PE router 120a before it became unreachable to route traffic originally destined for PE router 120a to another PE router 120 (e.g., a repair PE router 120).

Core router 110 is any appropriate network device that tunnels traffic to PE routers 120. PE routers 120 and CE routers 130 are any appropriate network devices that route data packets. CE routers 130 are routers through which an egress PE router 120 can reach a prefix. In some embodiments, PE routers 120 and CE routers 130 utilize Border Gateway Protocol (BGP) protocol. In some embodiments, core router 110 is a BGP-free core (i.e., BGP prefixes are only known to the PE routers 120 (core router 110 is unaware of all of the prefixes reachable by PE routers 120), and traffic is tunneled between PE routers 120). In a BGP-free core, where traffic is tunneled between edge routers, BGP speakers advertise reachability information about prefixes to other BGP speakers. For labeled address families, namely AFI/SAFI 1/4, 2/4, 1/128, and 2/128, an edge router (i.e., PE router 120) assigns local labels to prefixes and associates the local label with each advertised prefix such as L3VPN, 6PE, SOFTWIRE, and the like. Suppose that a given edge router is chosen as the best next-hop for a prefix "P/p." An ingress router (e.g., PE router 120d) that receives a packet from an external router and destined for prefix P/p "tunnels" the packet across the core to the appropriate PE router 120a-c. If the prefix P/p is a labeled prefix, the ingress router pushes the label advertised by the egress router (e.g., PE router 120a) before tunneling the packet to the egress router. Upon receiving the packet from core router 110, the egress router takes the appropriate forwarding decision based on the content of the packet or the label pushed on the packet.

In modern networks, it is not uncommon to have a prefix reachable via multiple edge routers. One example is the best external path. Another more common and widely deployed scenario is L3VPN with multi-homed VPN sites. As an example, consider the L3VPN example embodiment depicted in FIG. 1. In this embodiment, PE router 120a is the primary next hop (NH) for both 10.0.0.0/8 and 20.0.0.0/8 prefixes. At the same time, both 10.0.0.0/8 and 20.0.0.0/8 are reachable through PE router 120b and PE router 120c, respectively.

In certain embodiments, network 140 and VPNs 150 may refer to any interconnecting system capable of transmitting audio, video, signals, data, messages, or any combination of the preceding. Network 140 and VPNs 150 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Figure 2:
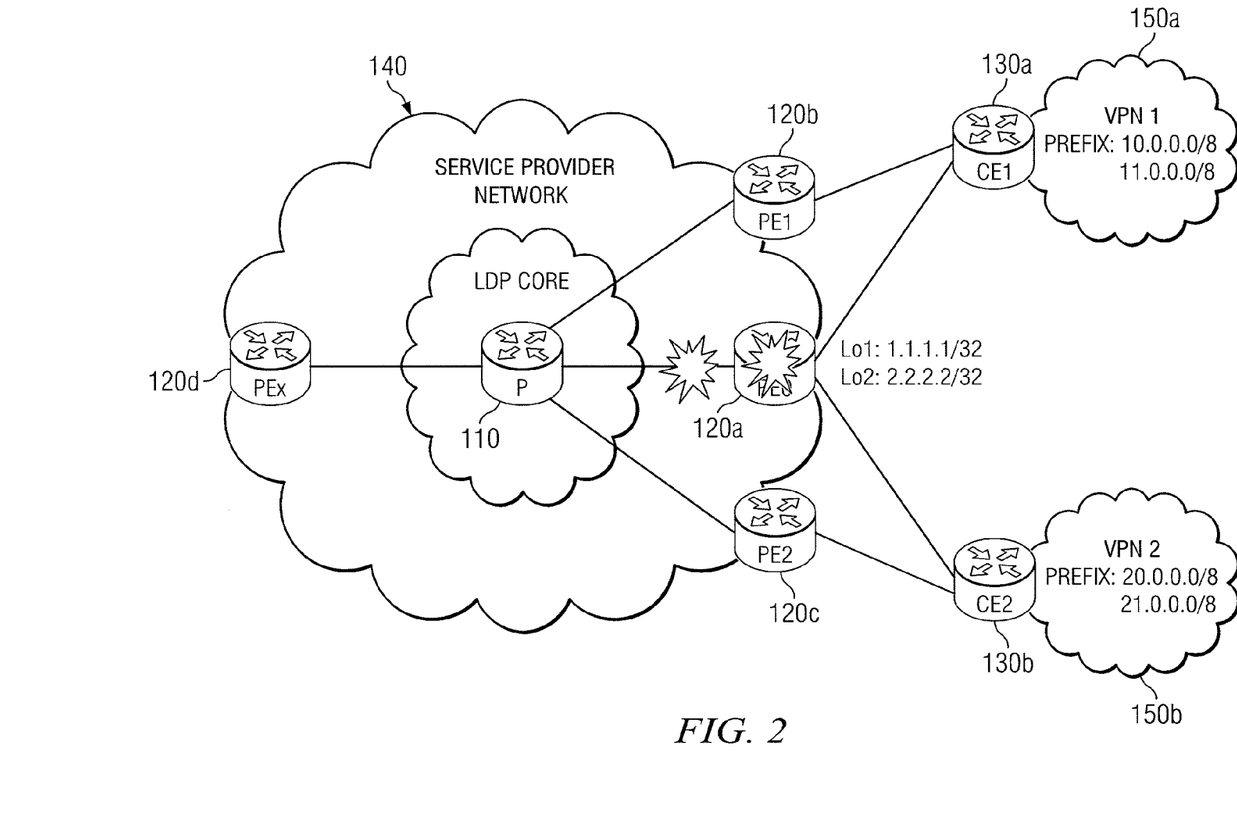
FIG. 2 illustrates another example system for providing protection against edge node failure, according to certain embodiments.

FIG. 2 illustrates an example embodiment of FIG. 1 where core router 110 loses connectivity to PE router 120a. Upon losing connectivity to PE router 120a, core router 110 needs to redirect traffic towards the correct backup edge router (i.e., the correct repair PE router 120). For example, on the failure of PE router 120a as illustrated in FIG. 2, core router 110 must reroute traffic for 10.0.0.0/8 towards PE router 120b and traffic for 20.0.0.0/8 towards PE router 120c. Rather than waiting for IGP or BGP to re-converge and update routing tables, as is the case for typical solutions, embodiment of the disclosure accomplish the rerouting of traffic by utilizing information advertised by PE router 120a before it becomes unreachable. Further details of the actions performed by core router 110 and PE router 120a to reroute traffic around an unreachable PE router 120a are discussed below.

In operation of example embodiments for unlabeled prefixes, a particular PE router 120 such as PE router 120a determines the prefixes that it is able to reach. In the example embodiments of FIGS. 1 and 2, PE router 120a may determine that it is able to reach prefix 10.0.0.0/8 associated with CE router 130a and prefix 20.0.0.0/8 associated with CE router 130b. In some embodiments, PE router 120a learns the prefixes that it is able to reach via an external neighbor. In some embodiments, the edge routers advertise the prefix P/p to some or all of its IBGP peers.

In some embodiments, PE router 120a chooses a repair PE router 120 for the external prefixes P/p that it is able to reach. In certain embodiments, a repair PE router 120 is another PE router 120 that advertises the same prefix to PE router 120a via IBGP peering. For example, if PE router 120b advertises the prefix 10.0.0.0/8 to PE router 120a, PE router 120a may choose PE router 120b as a repair PE router for prefix 10.0.0.0/8. Likewise, if PE router 120c advertises the prefix 20.0.0.0/8 to PE router 120a, PE router 120a may choose PE router 120c as a repair PE router for prefix 20.0.0.0/8.

In certain embodiments, PE router 120a groups the prefixes that it is able to reach into one or more groups based on the determined repair PE router 120 for each prefix. For example, prefixes having PE router 120b as their repair PE router may be placed in a first group. Likewise, prefixes having PE router 120c as their repair PE router may be placed in a second group. For each group, PE router 120a assigns a local next-hop. Thus if a prefix P/p belongs to a particular group Gi, its primary next-hop is NHi. For example, PE router 120a assigns a different loopback interface address as the next-hop for each of the groups of prefixes. When advertising the prefix and its primary next-hop to its internal BGP (IBGP) peers, PE router 120a uses NHi as the next-hop attribute of prefixes belonging to the group Gi.

Once repair PE routers are established for the prefixes, PE router 120a advertises a next-hop pair to the core (e.g., core router 110) using IGP. The next-hop pair may include the primary next-hop, denoted NHi, and a repair next-hop, denoted rNHi. The repair next-hop is the next-hop attribute advertised for the prefix P/p by the repair PE router 120 that is protecting the prefix. Because rNHi is the next-hop advertised by the repair PE router, rNHi will also be known to all core routers 110 via IGP. In some embodiments, PE router 120a advertises the pair (NHi, rNHi) to all directly connected core routers 110. In some embodiments, PE router 120a advertises the pair (NHi, rNHi) to all core routers 110 in service provider network 140. In certain embodiments, the next-hop pair (NHi, rNHi) may be advertised through an intermediate system to intermediate system (ISIS) optional type, length, and value (TLV). The semantics of the pair (NHi, rNHi) are: if the next-hop NHi becomes unreachable, then traffic destined to the next-hop NHi should be re-tunneled to the next-hop rNHi because rNHi can reach prefixes reachable via the primary next-hop NHi. Because of the advertising of the (NHi, rNHi) pair, core routers 110 that are directly coupled to the egress PE router 120 (and possibly other core routers 110) are aware of the repair next-hop for protected BGP prefixes reachable via the egress PE router 120 while remaining unaware of the BGP prefixes. This reduces the cost and complexity of core routers 110.

In operation of example embodiments for labeled prefixes, a particular PE router 120 such as PE router 120a determines the prefixes that it is able to reach. In the example embodiments of FIGS. 1 and 2, PE router 120a may determine that it is able to reach prefix 10.0.0.0/8 associated with CE router 130a and prefix 20.0.0.0/8 associated with CE router 130b. In some embodiments, PE router 120a learns the prefixes that it is able to reach via an external neighbor. PE router 120a then allocates a local label for each prefix it can reach through an external neighbor CE router 130. In some embodiments, PE router 120a advertises the prefix P/p together with the local label to some or all of its IBGP peers. In certain embodiments, PE router 120*a* additionally advertises a repair label to some or all of its IBGP peers.

In some embodiments, PE router 120*a* chooses a repair PE router 120 for the external prefixes P/p that it is able to reach. In certain embodiments, a repair PE router 120 is another PE router 120 that advertises the same prefix to PE router 120*a* via IBGP peering. For example, if PE router 120*b* advertises the prefix 10.0.0.0/8 to PE router 120*a*, PE router 120*a* may choose PE router 120*b* as a repair PE router for prefix 10.0.0.0/8. Likewise, if PE router 120*c* advertises the prefix 20.0.0.0/8 to PE router 120*a*, PE router 120*a* may choose PE router 120*c* as a repair PE router for prefix 20.0.0.0/8. In certain embodiments, PE router 120*a* may choose a label advertised by a repair PE router as the repair label for the prefixes protected by the repair label. For example, PE router 120*a* may choose the label advertised by PE router 120*b* as the repair label for the prefix 10.0.0.0/8 because PE router 120*b* was chosen as the repair PE router for the prefix 10.0.0.0/8.

In some embodiments, PE router 120*a* chooses a repair PE router 120 for the external prefix only if the repair label advertised for the prefix P/p by the repair PE router 120 is allocated on per-VPN or per-CE/per-next-hop basis. This is because it is desirable for core router 110 to remain BGP-free and the size of the routing table on core router 110 to remain independent of the number of BGP prefixes. If the repair label is allocated on a per-prefix basis, then this results in having the routing table on the core router comparable to the number of BGP prefixes because of the following. BGP prefix grouping discussed above requires two prefixes to belong to two different groups if the labels advertised by the repair PE for the two prefixes are different. Thus if the repair PE router allocates labels on a per-prefix basis, protected PE router 120*a* will advertise a different primary next-hop for each protected prefix (i.e., a prefix P/p that a BGP speaker has an external path to; the BGP speaker may learn about the prefix from an external peer through BGP, some other protocol, or manual configuration and the protected prefix is advertised to some or all the internal peers.) This is equivalent to having core router 110 knowing about every BGP prefix, which is undesirable. In addition the size of the routing table of core router 110 becomes comparable to the number of BGP prefixes, which is also undesirable.

PE router 120*a* groups the prefixes that it is able to reach into one or more groups based on the determined repair PE router 120 and repair label for each prefix. For example, prefixes having PE router 120*b* as their repair PE router and having the repair label of PE router 120*b* as their repair label may be placed in a first group. Likewise, prefixes having PE router 120*c* as their repair PE router and having the repair label of PE router 120*c* as their repair label may be placed in a second group. For each group, PE router 120*a* assigns a primary next-hop, NHi, and a repair path that includes a repair next-hop and the repair label. Thus if a prefix P/p belongs to group a particular group Gi, its primary next-hop is NHi. For example, PE router 120*a* assigns a different loopback interface address as the next-hop for each of the groups of prefixes. When advertising the prefix and its primary next-hop to its IBGP peers, PE router 120*a* uses NHi as the next-hop attribute of prefixes belonging to the group Gi.

Once repair PE routers are established for the prefixes, PE router 120*a* informs core router 110 about the repair path. It does this by advertising a next-hop triplet to the core (e.g., core router 110) using IGP. The next-hop triplet may include the primary next-hop, NHi, a repair next-hop, rNHi, and a repair label, rLi. The repair next-hop, rNHi, is the next-hop attribute advertised for the prefix P/p by the repair PE router 120 that is protecting the prefix. Because rNHi is the next-hop advertised by the repair PE router, rNHi will also be known to all core routers 110 via IGP. In some embodiments, PE router 120*a* advertises the triplet (NHi, rNHi, rLi) to all directly connected core routers 110. In some embodiments, PE router 120*a* advertises the triplet (NHi, rNHi, rLi) to all core routers 110 in service provider network 140. In certain embodiments, the next-hop triplet (NHi, rNHi, rLi) may be advertised through any appropriate means such as ISIS optional TLV. The semantics of the triplet (NHi, rNHi, rLi) are: if the next-hop NHi becomes unreachable, then traffic destined to the next-hop NHi should be re-tunneled to the next-hop rNHi and the label pushed by the ingress PE (i.e., a BGP speaker that learns about a prefix through another IBGP peer and chooses that IBGP peer as the next-hop for the prefix) is swapped with the label rLi irrespective of the value of the label pushed by the ingress PE. Because of the advertising of the (NHi, rNHi, rLi) triplet, core routers 110 that are directly coupled to the egress PE router 120 (and possibly other core routers 110) are aware of the repair next-hop for protected BGP prefixes reachable via the egress PE router 120 while remaining unaware of the BGP prefixes. This reduces the cost and complexity of core routers 110.

Core router 110 includes a forwarding plane that is programmed with instructions that are used to route incoming data packets to their appropriate destination. Through a typical IGP mechanism, core router 110 has a prefix matching every BGP next-hop. Let the next-hop NHi match the route Ri. Thus the forwarding information base (FIB) entry for Ri is programmed as follows for unlabeled prefixes: the primary next-hop is the next router on the path towards NHi, and the repair next-hop is the next-router on the path towards rNHi. For labeled prefixes, the next-hop of prefix Ri is on the path towards the protected egress PE router, and the next-hop of the prefix Ri is considered the primary path for the prefix Ri. The FIB for labeled prefixes is programmed as follow: the primary path is the next router on the path towards NHi, and for the repair path, pop label in the packet right under the tunnel header (irrespective of the value of that label), push the repair label rLi, and re-tunnel the packet towards the repair next-hop rNHi.

Once core router 110 detects that the primary next-hop for Ri (e.g., PE router 120*a*) is not reachable, it does the following for packets destined for the protected edge router. For unlabeled prefixes, core router 110 de-capsulates the tunnel header of the arriving packet and then tunnels the packet towards the repair egress PE router identified by the repair next-hop rNHj. For labeled prefixes, core router 110 de-capsulates the tunnel header to expose the labeled packet, swaps the label on the top of the packet (irrespective of the value of that label) with the repair label rLi, and then tunnels the packet towards the repair egress PE router identified by rNHj.

As an example for illustrative purposes only, consider the system of FIG. 2, which illustrates an example system 100 where PE router 120*a* becomes unreachable. In this example, the core is a Label Distribution Protocol (LDP) core. In addition, PE routers 120 advertise repair labels as follows. Each PE router 120 allocates a local label for each prefix it can reach through an external neighbor CE. This is the primary label used for normal traffic forwarding. To provide repair path information to all PE router 120, each PE router 120 also allocates a repair label to the prefix if it can reach that prefix via an external neighbor. PE router 120 allocates a single repair label for all prefixes that are reachable via a single external neighbor. Each PE 120 advertises both the primary and repair labels to its IBGP peers. When a PE router 120 receives the label advertisement from egress PE routers 120, it calculates a primary egress PE router 120 and a repair egress PE router 120 based on its internal path selection criteria. In the end, for some of the prefixes advertised by more than one PE router 120, a particular PE router 120 will have a primary path and a repair path consisting of a repair PE router 120 and a repair label advertised by the chosen repair PE router 120. In some embodiments, PE routers 120 do not protect a repair label. Thus, on any PE router 120, a repair label only has paths towards the CE. However a primary label may have a repair path towards a chosen repair PE router 120. Additional rules for allocating and advertising a repair label may include: a repair PE router 120 does not advertise a repair label for a prefix if it does not have an external path to the prefix, a repair PE router 120 does not associate an internal path with a repair label, and repair labels are advertised with labeled address families such as AFI/SAFI 1/4, 2/4, 1/128, and 2/128.

Continuing with the example embodiment of FIGURE and 2, PE router 120a is able to reach four prefixes: 10.0.0.0/8, 11.0.0.0/8, 20.0.0.0/8, and 21.0.0.0/8. PE router 120a may assign a separate label to each prefix. Any appropriate method and policy of assigning primary labels to each prefixes may be utilized. PE router 120b advertises the repair label rL1 for prefixes 10.0.0.0/8 and 11.0.0.0/8, and PE router 120c advertises the repair label rL2 for prefixes 20.0.0.0/8 and 21.0.0.0/8. PE router 120a divides its prefixes into two groups: G1={10.0.0.0/8, 11.0.0.0/8}, and G2={20.0.0.0/8, 21.0.0.0/8}.

When advertising the next-hop to its IBGP peer, PE router 120a advertises 1.1.1.1 as the next-hop for prefixes belonging to group G1 and 2.2.2.2 as the next-hop for prefixes belonging to group G2. PE router 120a advertises the prefixes 1.1.1.1/32 and 2.2.2.2/32 using the usual IGP mechanism. When advertising 1.1.1.1/32 into the core, PE router 120a advertises rL1 and PE router 120b as a repair path. When advertising 2.2.2.2/32 into the core, PE router 120a advertises rL2 and PE router 120c as a repair path. Any appropriate mechanism by which a repair path is advertised may be utilized.

On the penultimate hop router 110, LDP assigns a different LDP label to 1.1.1.1/32 and 2.2.2.2/32. Core routers other than penultimate hop routers may employ some sort of label aggregation to reduce the number of LDP labels. Assume that the penultimate hop router 110 assigns the local LDP label L1 for prefix 1.1.1.1/32 and L2 for prefix 2.2.2.2/32. On the penultimate router 110, the forwarding entry for L1 will be as follows. For the primary path: nexthop is PE router 120a; swap the incoming outer label with the LDP label towards 1.1.1.1. For the repair path: pop the incoming LDP label; swap the internal label with the repair label rL1; push the LDP label towards PE router 120b; and forward the packet.

On the core router 110, the forwarding entry for L2 will be as follows. For the primary path: same as L1 above. For the repair path: pop the incoming LDP label; swap the internal label with the repair label rL2; push the LDP label towards PE router 120c; and forward the packet.

If core router 110 detects that PE router 120a is no longer reachable, it can use the repair path already pre-programmed in the forwarding plane as described above. Because the repair path is pre-programmed as in the case of traffic engineering (TE) and IP Fast ReRoute (FRR), core router 110 can re-route traffic very fast, without waiting for IGP or BGP to reconverge.

Figure 3:
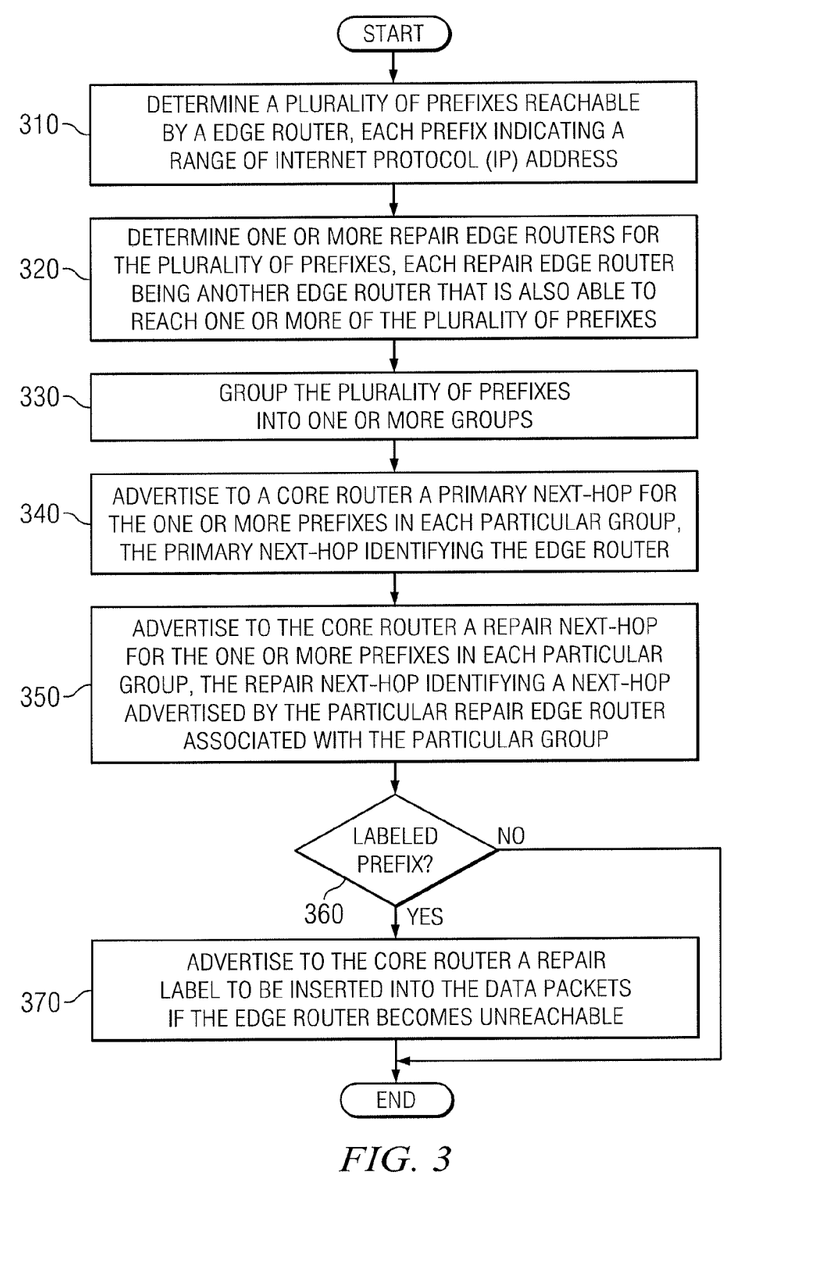
FIG. 3 illustrates an example method of providing protection against edge node failure, according to certain embodiments.

FIG. 3 illustrates an example method that may be performed by a particular PE router 120 for providing protection against edge node failure. The method may start at step 310, where a plurality of prefixes that are reachable by an edge router are determined. For example, as illustrated in the example embodiment of FIG. 2 above, PE router 120a may determine that it is able to reach prefixes 10.0.0.0/8 and 11.0.0.0/8 that are associated with CE router 130a, and prefixes 20.0.0.0/8 and 21.0.0.0/8 that are associated with CE router 130a.

At step 320, one or more repair edge routers for the plurality of prefixes of step 310 may be determined. In some embodiments, each repair edge router is another edge router that is also able to reach one or more of the plurality of prefixes of step 310. In the embodiment of FIG. 2, for example, PE router 120a may determine that PE router 120b is an appropriate repair edge router for prefixes 10.0.0.0/8 and 11.0.0.0/8, and that PE router 120c is an appropriate repair edge router for prefixes 20.0.0.0/8 and 21.0.0.0/8. In some embodiments, PE router 120a may determine that a particular PE router 120 is an appropriate repair edge router for a particular prefix if the particular PE router 120 advertises the particular prefix to PE router 120a.

At step 330, the plurality of prefixes of step 310 are grouped into one or more groups. In some embodiments, all of the prefixes in each particular group are reachable by both the PE router and the particular repair PE router associated with the particular group. In certain embodiments, each group is associated with a particular repair PE router 120. In the embodiment of FIG. 2, for example, PE router 120a groups prefixes 10.0.0.0/8 and 11.0.0.0/8 into a first group because they are reachable by both PE router 120a and PE router 120b. Likewise, PE router 120a may group prefixes 20.0.0.0/8 and 21.0.0.0/8 into a second group because they are reachable by both PE router 120a and PE router 120c.

At steps 340, 350, and 370, instructions are communicated to a core router to send data packets associated with all of the prefixes in each particular group of step 330 to the particular PE router associated with the particular group if the PE router becomes unreachable. In step 340, some embodiments advertise, by the PE router to the core router, a primary next-hop for the prefixes in each particular group. In step 350, some embodiments advertise, by the PE router to the core router, a repair next-hop for the prefixes in each particular group. In certain embodiments, the repair next-hop identifies a next-hop advertised by the particular repair PE router associated with the particular group.

At step 360, it is determined whether the prefixes of step 310 are labeled prefixes. If it is determined that the prefixes are labeled prefixes, some embodiments proceed to step 370 where a repair label that is to be inserted into data packets is advertised to the core router. If it is determined that the prefixes are not labeled prefixes, the method of FIG. 3 may end. While steps 340, 350, ad 370 are listed as independent steps, it should be understood that embodiments of the disclosure advertise the appropriate information from these steps in a combined manner.

Figure 4:
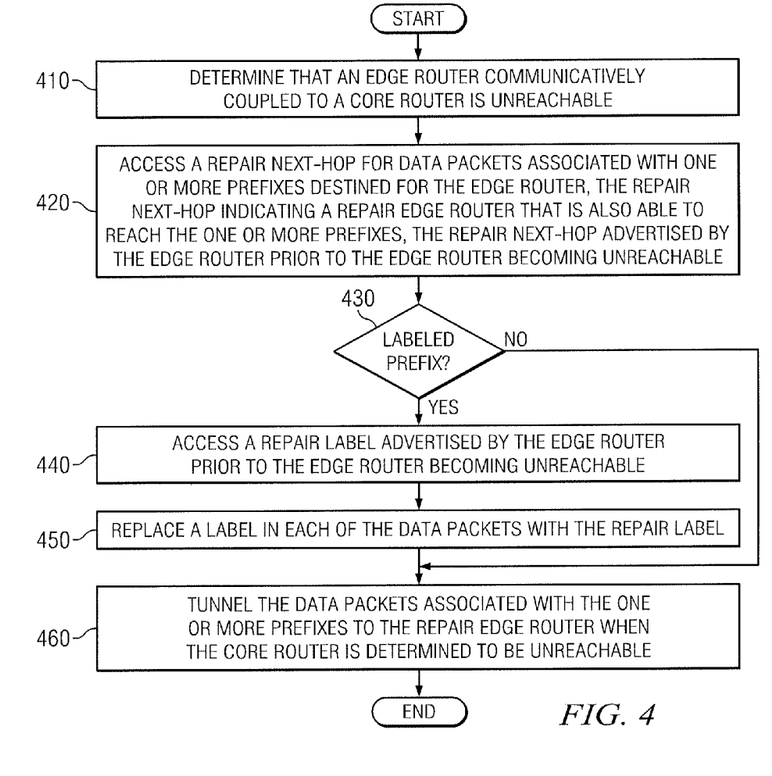
FIG. 4 illustrates another example method of providing protection against edge node failure, according to certain embodiments.

FIG. 4 illustrates an example method that is performed by a particular core router 110 for providing protection against edge node failure. The method starts at step 410, where it is determined that an edge router communicatively coupled to a core router is unreachable. For example, the edge router may become unreachable when it crashes, loses power, loses connectivity, when a link between the core router and the edge routers goes down, or any other situation in which the edge router becomes unreachable by the core router. Step 410 may include any appropriate method of determining that the edge node has become unreachable. For example, the core router may determine that the edge router is unreachable when it does not receive a response from the edge node, when another edge node informs the core router that the edge node is unreachable, or any other appropriate method. In certain embodiments, the edge router may refer to any PE router 120 and the core router may refer to core router 110 discussed above.

At step 420, a repair next-hop for data packets associated with one or more prefixes destined for the edge router is accessed. For example, the repair next-hop may be stored in memory accessible to the core router. The repair next-hop indicates a repair edge router that is also able to reach the one or more prefixes. The repair next-hop is advertised by the edge router prior to the edge router becoming unreachable. In some embodiments, the repair next-hop refers to rNHi described above. In certain embodiments, the repair next-hop may refer to any PE router 120 described above.

At step 430, it is determined whether the prefixes of step 420 are labeled prefixes. If it is determined that the prefixes are not labeled prefixes, the method of FIG. 4 proceeds to step 460 below. If it is determined that the prefixes are labeled prefixes, the method of FIG. 4 proceeds to step 440 where a repair label that is to be inserted into data packets is accessed. The accessed repair label is advertised by the edge router prior to the edge router becoming unreachable. The repair label refers to repair label rLi described above.

At step 450, a label in data packets originally destined for the edge router that has become unreachable are replaced with the repair label of step 430. The core router swaps the label previously advertised by the unreachable edge router with the label advertised by the backup edge router. For example, the core router de-capsulates the tunnel header of each data packet to expose the labeled packet and swaps the label on the top of the packet (irrespective of the value of that label) with the repair label rLi accessed in step 440.

At step 460, the data packets associated with the one or more prefixes are tunneled to the repair edge router when the primary edge router is determined to be unreachable. In some embodiments, for example, the core router tunnels data packet towards the repair egress PE router identified by rNHj when the edge router of step 410 becomes unreachable. After step 460, the method of FIG. 4 may end.

Although this disclosure describes and illustrates particular steps of the methods of FIGS. 3 and 4 as occurring in a particular order, this disclosure contemplates any suitable steps of the methods of FIGS. 3 and 4 occurring in any suitable order. Moreover, although this disclosure describes and illustrates particular components carrying out particular steps of the methods of FIGS. 3 and 4, this disclosure contemplates any suitable combination of any suitable components carrying out any suitable steps of the methods of FIGS. 3 and 4.

Figure 5:
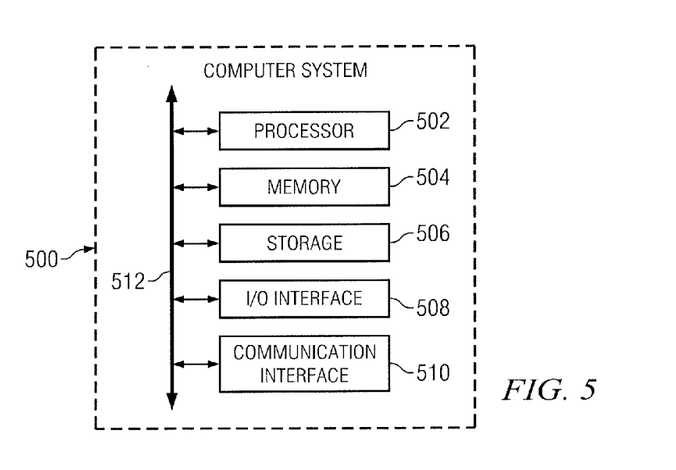
FIG. 5 illustrates an example computer system that may be utilized by the systems and methods of FIGS. 1-4 to provide protection against edge node failure, according to certain embodiments.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (e.g., another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (e.g., packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 502 (e.g., one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The components of system 100 and 500 may be integrated or separated. In some embodiments, components of system 100 and 500 may each be housed within a single chassis. The operations of system 100 and 500 may be performed by more, fewer, or other components. Additionally, operations of system 100 and 500 may be performed using any suitable logic that may comprise software, hardware, other logic, or any suitable combination of the preceding.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a SSD, a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, reference to a "primary egress PE" may refer to an IBGP peer that can reach a protected prefix P/p through an external path and advertises the prefix to the other IBGP peers. The primary egress PE may be chosen as the best path by one or more internal peers. In other words, the primary egress PE is an egress PE that will normally be used by some ingress PEs when there is no failure. Referring to FIG. 1 as an example, PE router 120*a* may be a primary egress PE.

Herein, reference to a "primary next-hop" may refer to an IPv4 or IPv6 host address belonging to a primary egress PE. If the prefix is advertised via BGP, the primary next-hop may be the next-hop attribute in the BGP update message.

Herein, reference to a "repair egress PE" may refer to an egress PE router other than the primary egress PE router that can reach the protected prefix P/p through an external neighbor. The repair PE is pre-calculated via other PEs prior to any failure. Referring to FIG. 1, PE router 120*b* is the repair PE for 10.0.0.0/8 while PE router 120*c* is the repair PE for 20.0.0.0/8.

Herein, reference to a "repair path" refers to the repair egress PE. If the protected prefix is a labeled prefix, the repair path may be the repair egress PE together with the label that will be pushed when the repairing core router reroutes traffic to the repair PE.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A network device comprising:
one or more communication interfaces; and
one or more processing devices operable to:
determine a plurality of prefixes that are reachable by the network device, each prefix indicating a range of Internet Protocol (IP) addresses;
group the plurality of prefixes into one or more groups, wherein:
each group is associated with a particular router of a plurality of routers; and
the prefixes in each particular group are reachable by both the network device and the particular router associated with the particular group; and
communicate instructions to send data packets associated with the prefixes in each particular group to the particular router associated with the particular group if the network device becomes unreachable.

2. The network device of claim 1, wherein the instructions are communicated using Border Gateway Protocol (BGP) protocol.

3. The network device of claim 1, wherein the network device and the plurality of routers are edge routers.

4. The network device of claim 1, wherein the instructions are communicated to a core router.

5. The network device of claim 4, wherein the core router is a BGP-free router.

6. The network device of claim 1, wherein communicating instructions to send data packets associated with the prefixes in each particular group to the particular router associated with the particular group if the network device becomes unreachable comprises advertising a primary next-hop for the one or more prefixes.

7. The network device of claim 6, wherein communicating instructions to send data packets associated with the prefixes in each particular group to the particular router associated with the particular group if the network device becomes unreachable further comprises advertising a repair next-hop for the one or more prefixes.

8. The network device of claim 7, wherein communicating instructions to send data packets associated with the prefixes in each particular group to the particular router associated with the particular group if the network device becomes unreachable further comprises advertising a repair label to be inserted into the data packets if the network device becomes unreachable.

9. The network device of claim 1, wherein the instructions are communicated before the network device becomes unreachable.

10. The network device of claim 1, wherein the instructions are communicated by the network device to a core router using a communications protocol other than BGP.

11. One or more computer-readable non-transitory storage media embodying software this is operable when executed by one or more processors to:
   determine a plurality of prefixes that are reachable by a network device, each prefix indicating a range of Internet Protocol (IP) addresses;
   group the plurality of prefixes into one or more groups, wherein:
      each group is associated with a particular router of a plurality of routers; and
      the prefixes in each particular group are reachable by both the network device and the particular router associated with the particular group; and
   communicate instructions to send data packets associated with the prefixes in each particular group to the particular router associated with the particular group if the network device becomes unreachable.

12. The media of claim 11, wherein the software is operable to communicate with other network devices using Border Gateway Protocol (BGP) protocol.

13. The media of claim 11, wherein the network device and the plurality of routers are edge routers.

14. The media of claim 11, wherein the instructions are communicated to a core router.

15. The media of claim 14, wherein the core router is a BGP-free router.

16. The media of claim 14, wherein the instructions are communicated before the network device becomes unreachable.

17. The media of claim 14, wherein the instructions are communicated by the network device to a core router using a communications protocol other than BGP.

18. The media of claim 11, wherein communicating instructions to send data packets associated with the prefixes in each particular group to the particular router associated with the particular group if the network device becomes unreachable comprises:
   advertising a primary next-hop for the one or more prefixes; and
   advertising a repair next-hop for the one or more prefixes.

19. The media of claim 18, wherein communicating instructions to send data packets associated with the prefixes in each particular group to the particular router associated with the particular group if the network device becomes unreachable further comprises advertising a repair label to be inserted into the data packets if the network device becomes unreachable.

20. A system comprising:
   a means for determining a plurality of prefixes that are reachable by a network device, each prefix indicating a range of Internet Protocol (IP) addresses;
   a means for grouping the plurality of prefixes into one or more groups, wherein:
      each group is associated with a particular router; and
      the prefixes in each particular group are reachable by both the network device and the particular router associated with the particular group; and
   a means for communicating instructions to send data packets associated with the prefixes in each particular group to the particular router associated with the particular group if the network device becomes unreachable.

* * * * *